Figure 1:
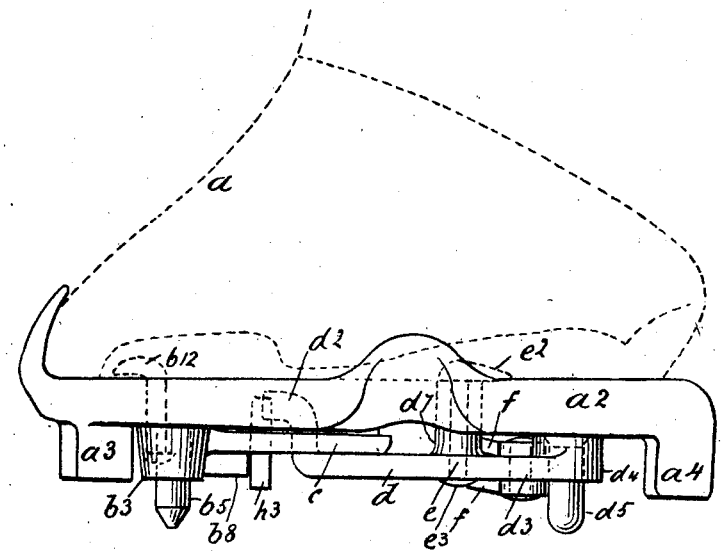

No. 833,172. PATENTED OCT. 16, 1906.
L. M. MUSSELMAN.
DETACHABLE CALK HOLDER FOR HORSESHOES.
APPLICATION FILED JAN. 29, 1906.

2 SHEETS—SHEET 1.

WITNESSES
Ernest A. Hagen
F. A. Stewart

INVENTOR
Laylon Morris Musselman
BY HIS
Edgar Tate & Co
ATTORNEYS

No. 833,172. PATENTED OCT. 16, 1906.
L. M. MUSSELMAN.
DETACHABLE CALK HOLDER FOR HORSESHOES.
APPLICATION FILED JAN. 29, 1906.
2 SHEETS—SHEET 2.
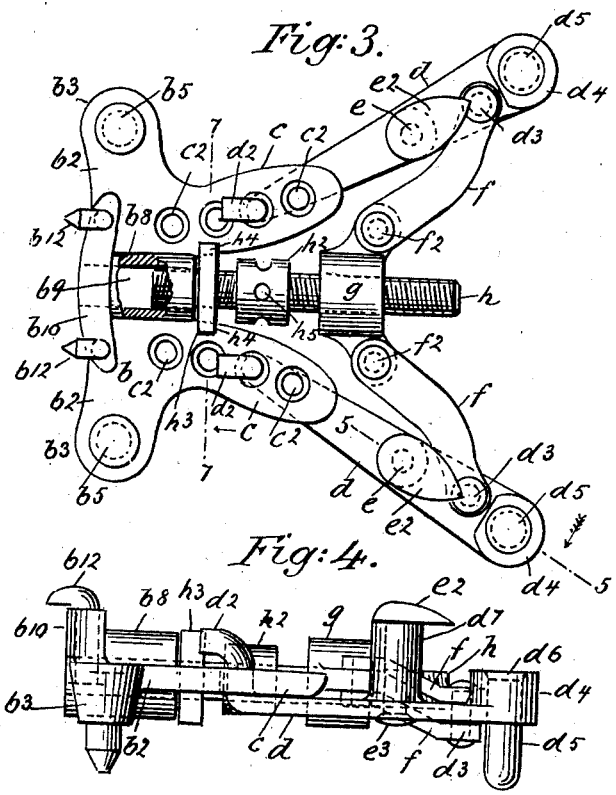
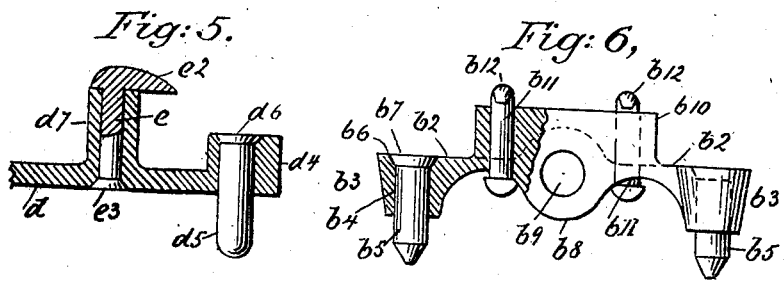
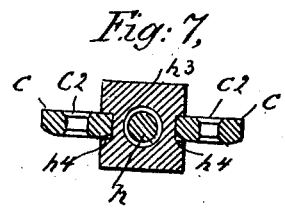
WITNESSES
INVENTOR
Layton Morris Musselman
BY HIS
ATTORNEYS

UNITED STATES PATENT OFFICE.

LAYTON MORRIS MUSSELMAN, OF CHESTER, PENNSYLVANIA.

DETACHABLE CALK-HOLDER FOR HORSESHOES.

No. 833,172.  Specification of Letters Patent.  Patented Oct. 16, 1906.

Application filed January 29, 1906. Serial No. 298,356.

*To all whom it may concern:*

Be it known that I, LAYTON MORRIS MUSSELMAN, a citizen of the United States, residing at Chester, in the county of Delaware and State of Pennsylvania, have invented certain new and useful Improvements in Detachable Calk-Holders for Horseshoes, of which the following is a specification, such as will enable those skilled in the art to which it appertains to make and use the same.

This invention relates to detachable calk-holders for horseshoes; and the object thereof is to provide an improved device of this class designed for use in emergency cases, a further object being to provide a detachable calk-holder for horseshoes the parts of which are adjustable, so that it may be applied to shoes of different sizes, a further object being to provide a detachable calk-holder for horseshoes the calks of which are detachable and may be substituted by new ones whenever desired; and with these and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 2:
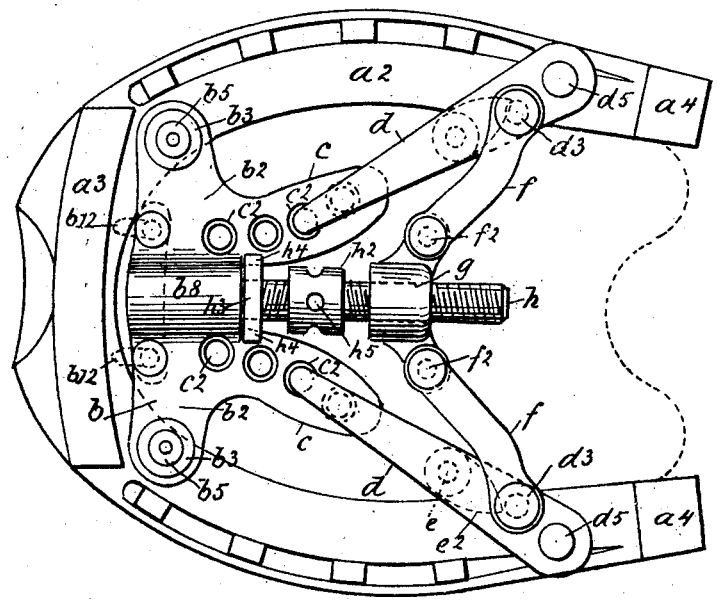

Figure 1 is a side view of a horseshoe, indicated as secured to the hoof of a horse and provided with my improved detachable calk-holder; Fig. 2, a bottom plan view thereof; Fig. 3, a bottom plan view of the calk-holder detached from the shoe; Fig. 4, a side view thereof; Fig. 5, a partial section on the line 5 5 of Fig. 3; Fig. 6, a sectional front end view of the calk-holder, and Fig. 7 a section on the line 7 7 of Fig. 1.

In the drawings forming part of this specification I have indicated in dotted lines at $a$ the hoof of a horse, and I have also shown in Figs. 1 and 2 a shoe $a^2$ of the usual form and which is indicated as secured to the hoof $a$, and the shoe $a^2$ is provided with the usual front calk $a^3$ and rear calks $a^4$; but it will be understood that the shoe $a^2$ forms no part of my invention and may be constructed or formed in the usual or any desired manner.

In the practice of my invention I provide a detachable calk-holder comprising a front cross-head member $b$, provided with laterally-directed arms $b^2$, having at their ends calk-holders $b^3$, which in the form of construction shown are thickened or extended downwardly and provided with apertures $b^4$, into which are driven toe-calks $b^5$. The apertures $b^4$ in the top surface of the arms $b^2$ are preferably enlarged or chamfered, as shown at $b^6$, and when the calks $b^5$ are driven downwardly therethrough the head ends thereof are preferably riveted, as shown at $b^7$; but this is not absolutely necessary, and the said head ends of the calks $b$ may be riveted or flattened without being countersunk in the calk-holders $b^3$.

The central portion of the cross-head $b$ is enlarged forwardly and backwardly, as shown at $b^8$, and provided with a forwardly and backwardly ranging central bore $b^9$, and arranged centrally and transversely of the cross-head $b$ and on the top surface thereof is an oblong member or supplemental holder $b^{10}$, through which are driven nails or similar devices $b^{11}$. The nails or similar devices $b^{11}$ are driven upwardly through the cross-head $b$, and the upper ends thereof are bent forwardly to form hooks $b^{12}$, which are designed to engage the front end portion of the shoe, as indicated in dotted lines in Figs. 1 and 2, and the nails or similar devices $b^{11}$, if the hook members $b^{12}$ are broken off at any time, may be driven out of the cross-head $b$ and new nails or similar devices driven therethrough. The cross-head $b$ of the detachable calk-holder is also provided with backwardly and laterally directed arms $c$, provided at regular intervals with holes $c^2$, four of which are shown in the drawings, and I also provide two lever-arms $d$, adapted to be connected with the arms $c$ and provided at their forward ends with upwardly and forwardly directed hook members $d^2$, adapted to be passed upwardly through the holes $c^2$ in the arms $c$, and pivoted to the outer end portions of each of the lever-arms $d$ at $d^3$ are double-link members $f$, which range inwardly and forwardly of the lever-arms $d$ and are pivoted at $f^2$ to a collar or sleeve $g$, through which is passed a bolt $h$, provided centrally with an enlarged hub member $h^2$, and the opposite end portions of which are provided with reverse or different threads. The collar or sleeve $g$ is threaded to correspond with the thread on the rear end of the bolt $h$, and on the front end portion thereof is mounted a non-rotatable nut $h^3$, (shown in section in Fig. 7,) and the front end of the bolt $h$ passes into the bore $b^9$ of the enlarged central portion $b^8$ of the cross-head $b$, and the nut $h^3$ is provided in its opposite sides with recesses $h^4$, in which the side arms $c$ of the cross-head $b$ fit, so as to prevent its rotation, and the central enlarged portion or hub $h^2$ of the bolt $h$ is provided with transverse holes $h^5$, through which a suitable tool or instrument may be inserted for turning said bolt.

It will be observed that the lever-arms $d$ are in a plane below the arms $c$ when the device is in use and the outer ends of the lever-arms $d$ are provided with enlarged or upwardly-directed heads $d^4$, forming calk-holders through which are driven heel-calks $d^5$. The heel-calks $d^5$ are driven downwardly through the calk-holders $d^4$ in the same manner as the toe-calks $b^5$, and the upper ends thereof are riveted, as shown at $d^6$, and it will be understood that when the calk-holder is in position on the shoe or attached thereto the head ends of all the calks bear on the shoe. The lever-arms $d$ are also provided inwardly of the pivotal connection at $d^3$ of the double-link members $f$ with upwardly-directed lugs or projections $d^7$, through which are driven bolts, pins, or similar devices $e$. The upper ends of the bolts or pins $e$ are provided with oblong pointed heads $e^2$, the points of which are directed backwardly, and said pins or bolts are in practice driven downwardly through the lever-arms $d$ and the lower ends thereof are riveted, as shown at $e^3$, to form heads which may or may not be countersunk.

When the parts of the device are constructed and assembled as shown and described, the said device is ready for use and may be connected with a shoe or detached therefrom whenever desired. In the operation of connecting the calk-holder device with the shoe the bolt $h$ is turned in order to draw in the lever-arms $d$, so that they will enter between the side portions of the shoe. The device is then manipulated so as to pass the hook members $b^{12}$ under the front portion of the shoe or between the front portion of the shoe and the hoof, as indicated in Figs. 1 and 2. The bolt $h$ is then turned so as to force the double-link members $f$ and lever-arms $d$ outwardly into the position shown in Fig. 2, and in this operation the pointed ends of the heads $e^2$ of the bolts or similar devices $e$ pass between the side portions of the shoe and the hoof, as indicated in dotted lines in Fig. 2, and securely lock the device to the shoe. In order to detach the device from the shoe, the bolt $h$ is turned in the opposite direction and the lever-arms $d$ drawn inwardly.

As hereinbefore stated, the socket or bore member $b^8$ of the cross-head $b$ is not threaded interiorly, and the front end of the bolt $h$ is free to turn therein. It will be understood that the lever-arms $d$ may be adjusted forwardly or backwardly by means of the separate holes in the arms $c$, and in some cases where the calk-holding device is used in connection with small shoes the nut $h^3$ is not absolutely necessary; but when the said calk-holding device is used in connection with large shoes the distance between the collar or sleeve $g$ and the cross-head $b$ is so great that there is danger of breaking the bolt $h$; but by using the nut $h^3$ in the manner described the effect is to reduce the distance between the collar or sleeve $g$ and the cross-head $b$ and to correspondingly reduce the danger of breaking said bolt.

From the foregoing description it will be seen that all of the calks are detachable and may be substituted by new ones at any time by detaching the calk-holder from the shoe, and all that is necessary to do this is to drive out the old calks and drive in new ones, and this also applies to the nails, bolts, or similar devices $b^{11}$, which carry the hook members $b^2$, and to the bolts or similar devices $e$, provided with the heads $e^2$. It will also be seen that the length of the calk-holder is adjustable longitudinally, and by reason of the arm-levers $d$ and method of adjusting the same the heel-calk members are also adjustable transversely or laterally.

It will be apparent that this device may be made of any desired strength or weight and, as hereinbefore stated, may be connected with or used in connection with horseshoes of any kind or class.

Having fully described my invention, what I claim as new, and desire to secure by Letters Patent, is—

1. A detachable calk-holder for use in connection with horseshoes, comprising a front cross-head member provided with detachable toe-calks and detachable hook members adapted to engage the top of the front portion of the shoe when the latter is in position, said cross-head member being also provided with backwardly-directed arms, lever-arms detachably and pivotally connected with said backwardly-directed arms, link members pivoted to the rear end portions of said lever-arms and ranging inwardly and forwardly, a sleeve or collar pivoted to the inner ends of said link members, a bolt movable longitudinally through the front cross-head and passing through said collar or sleeve, said collar or sleeve being threaded interiorly and said bolt being provided at its opposite ends with reverse threads and centrally thereof with an enlarged central or hub portion having transverse holes, and said lever-arms being provided at their rear ends with detachable calks and forwardly of the pivotal connection therewith of said link members with devices adapted to engage the sides of the shoe and to enter between the same and the hoof when the shoe is in position, substantially as shown and described.

2. A detachable calk-holder for use in connection with horseshoes, comprising a front cross-head member provided with detachable toe-calks and detachable hook members adapted to engage the top of the front portion of the shoe when the latter is in position, said cross-head member being also provided with backwardly-directed arms, lever-arms detachably and pivotally connected with said backwardly-directed arms, link members pivoted to the rear end portion of said lever-arms and ranging inwardly and forwardly, a sleeve or collar pivoted to the inner ends of said link members, a bolt movable longitudinally through the front cross-head and passing through said collar or sleeve, said collar or sleeve being threaded interiorly and said bolt being provided at its opposite ends with reverse threads and centrally thereof with an enlarged central or hub portion having transverse holes, and said lever-arms being provided at their rear ends with detachable calks and forwardly of the pivotal connection therewith of said link members with devices adapted to engage the sides of the shoe and to enter between the same and the hoof when the shoe is in position, said lever-arms being also adjustable longitudinally of the arms of the cross-head, substantially as shown and described.

3. A detachable calk-holder for use in connection with horseshoes, comprising a front cross-head member provided with detachable toe-calks and detachable hook members adapted to engage the top of the front portion of the shoe when the latter is in position, said cross-head member being also provided with backwardly-directed arms, lever-arms detachably and pivotally connected with said backwardly-directed arms, link members pivoted to the rear end portion of said lever-arms and ranging inwardly and forwardly, a sleeve or collar pivoted to the inner ends of said link members, a bolt movable longitudinally through the front cross-head and passing through said collar or sleeve, said collar or sleeve being threaded interiorly and said bolt being provided at its opposite ends with reverse threads and centrally thereof with an enlarged central or hub portion having transverse holes, and said lever-arms being provided at their rear ends with detachable calks and forwardly of the pivotal connection therewith of said link members with devices adapted to engage the sides of the shoe and to enter between the same and the hoof when the shoe is in position, said lever-arms being also adjustable longitudinally of the arms of the cross-head, and said bolt being provided on the front end portion thereof rearwardly of the cross-head with a non-rotatable nut, substantially as shown and described.

4. A detachable calk-holder for use in connection with horseshoes, comprising a front cross-head member provided with detachable toe-calks and detachable hook members adapted to engage the top front portion of the shoe when the latter is in position, said cross-head member being also provided with backwardly-directed arms having a plurality of holes formed therein, lever-arms provided at their front ends with hook members adapted to be passed through said holes, link members pivoted to the rear end portions of said lever-arms and ranging inwardly and forwardly, a sleeve or collar pivoted to the inner ends of said link members, a bolt movable longitudinally through said sleeve or collar and into the front cross-head portion, said bolt being provided at its opposite ends with reverse threads and with a central enlarged portion having transverse holes, said collar or sleeve being threaded interiorly to correspond with the thread on the rear end portion of said bolt, and said lever-arms being provided at their rear ends with detachable calks and forwardly of the pivotal connection therewith of said link members with devices adapted to engage the sides of the shoe and to enter between the same and the hoof when the shoe is in position, substantially as shown and described.

5. A detachable calk-holder for use in connection with horseshoes, comprising a front cross-head member provided with detachable toe-calks and detachable hook members adapted to engage the top front portion of the shoe when the latter is in position, said cross-head member being also provided with backwardly-directed arms, lever-arms detachably and pivotally connected with said backwardly-directed cross-head arms and provided with detachable heel-calks, and with devices for engaging the opposite sides of the shoe when said lever-arms are forced outwardly, and means for forcing said lever-arms outwardly, substantially as shown and described.

In testimony that I claim the foregoing as my invention I have signed my name, in presence of the subscribing witnesses, this 25th day of January, 1906.

LAYTON MORRIS MUSSELMAN.

Witnesses:
THOMAS BIRCH,
CHARLES E. HEILIG.